(12) United States Patent
Hayashi et al.

(10) Patent No.: US 7,467,807 B2
(45) Date of Patent: Dec. 23, 2008

(54) INFLATOR FOR AIR BAG

(75) Inventors: Kazutoshi Hayashi, Aichi (JP); Tadashi Yamamoto, Aichi (JP); Yasuo Ochiai, Aichi (JP); Michiyasu Ito, Aichi (JP); Takashi Sasaki, Aichi (JP); Yuzo Gotoh, Hyogo (JP); Masakazu Tokuda, Hyogo (JP)

(73) Assignees: Toyoda Gosei Co., Ltd., Aichi (JP); Daicel Chemical Industries, Ltd., Osaka (JP)

( * ) Notice: Subject to any disclaimer, the term of this patent is extended or adjusted under 35 U.S.C. 154(b) by 349 days.

(21) Appl. No.: 10/940,952

(22) Filed: Sep. 15, 2004

(65) Prior Publication Data

US 2005/0067814 A1    Mar. 31, 2005

(30) Foreign Application Priority Data

Sep. 25, 2004    (JP)    ............................. 2003-332978

(51) Int. Cl.
B60R 21/16    (2006.01)
(52) U.S. Cl. .................................. 280/728.2
(58) Field of Classification Search ............. 280/728.2, 280/730.2, 743.1
See application file for complete search history.

(56) References Cited

U.S. PATENT DOCUMENTS

| 6,241,278 | B1 * | 6/2001 | Roote et al. | ............... 280/730.2 |
|---|---|---|---|---|
| 6,585,287 | B1 * | 7/2003 | Spaulding et al. | ......... 280/728.2 |
| 6,857,319 | B2 | 2/2005 | Nakayasu et al. | |
| 6,945,554 | B2 * | 9/2005 | Henderson et al. | ........ 280/728.2 |
| 2004/0094937 | A1 * | 5/2004 | Steimke | .................... 280/728.2 |
| 2005/0189740 | A1 * | 9/2005 | Stevens | ..................... 280/728.2 |
| 2005/0194767 | A1 * | 9/2005 | Freisler et al. | ............ 280/728.2 |
| 2006/0192368 | A1 * | 8/2006 | Hall et al. | ................. 280/730.2 |

FOREIGN PATENT DOCUMENTS

| DE | 20021673 U1 * | 4/2001 |
|---|---|---|
| JP | 07-291078 | 11/1995 |
| JP | 11-255064 A | 9/1999 |
| JP | 2000-095058 | 4/2000 |
| JP | 2002-347564 | 12/2002 |
| JP | 2003-035643 | 2/2003 |
| JP | 2003-35643 A | 2/2003 |
| JP | 2003-095053 | 4/2003 |
| JP | 2004-074867 | 3/2004 |

* cited by examiner

Primary Examiner—Paul N. Dickson
Assistant Examiner—Drew J. Brown
(74) Attorney, Agent, or Firm—Birch, Stewart, Kolasch & Birch, LLP

(57) ABSTRACT

An inflator for an air bag, includes, a tubular housing including a gas discharge portion, a first fixing member provided in an outer circumferential surface of the tubular housing for fixing the inflator to a vehicle, the first fixing member including a contacting surface fixed to the outer circumferential surface, and a non-contacting surface extending in a direction tangential to the outer circumferential surface from one end of the first fixing member without contacting the outer circumferential surface. The first fixing member has a rib that extends from the contacting surface to the non-contacting surface.

15 Claims, 4 Drawing Sheets

INFLATOR FOR AIR BAG

This Non-provisional application claims priority under 35 U.S.C. § 119(a) on Patent Application No(s). 2003-332978 filed in Japan on Sep. 25, 2003, the entire contents of which are hereby incorporated by reference.

BACKGROUND OF THE INVENTION

1. Field of the Invention

The present invention is related to an inflator for an air bag applied to an air bag system of a vehicle.

2. Description of the Related Art

An inflator (a gas generator) used in an air bag system mounted in a vehicle is fixed in a predetermined position by being fixed in a module combined with an air bag or by being attached to a component of a vehicle. Therefore, a fixing member is attached to a gas generator housing in order to make fixing work easy and secure.

Such a fixing member is demanded to be easily attached to a housing, not to affect performance of an inflator with its attaching work, not to interfere with storage and transporting work of an inflator with its bulkiness, to make fixing work of an inflator to a vehicle easy and to enhance a fixing strength to a vehicle.

In FIG. 1 of JP-A No. 11-255064, a gas generator system (a gas generator and an introducing pipe) used in a curtain inflator and so on is disclosed. In this gas generator system, a pipe 5 for introducing gas into an air bag is integrally attached, in a state of being inserted into a seal 17, by two shells 7 and 9 such that the seal 17 is pressed, to form an airtight connection between the gas generator housing 13 and the pipe 5. Flanges 18 for fixing the gas generator to a vehicle etc. are attached to the shell 7 among two shells.

That is, the shell 7 is a single structure comprising flanges 18 for attaching to a vehicle and a connecting portion to the gas generator, having a complicated shape. Furthermore, both of these fixing members (shells 7 and 9) are to be attached to a completed product of a gas generator and means such as a screw (FIG. 1), bending (FIG. 2) and so on are used, and therefore, a margin for a screw or bending needs to be arranged, which increases protruding volume from the housing, making it disturbing in handling.

SUMMARY OF THE INVENTION

The present invention provides an inflator for an air bag containing a fixing member having a high fixing strength to a vehicle and a module without being bulky in manufacture and transportation, an assembling method and a mounting method thereof.

The present invention provides an inflator for an air bag comprising a tubular housing containing an inflation means for an air bag and a gas discharge portion, and further a mounting means to a vehicle, wherein the mounting means to a vehicle is one or more first fixing member fixed to a circumferential surface of the tubular housing, in the first fixing member, part of a surface is fixed to at least part of the circumferential surface of the tubular housing and the remaining surface is radially extended, not contacting the circumferential surface of the tubular housing, a radial length of the remaining surface is 0.5 to 1.5 times a diameter of the tubular housing and the remaining surface is attached to the vehicle directly or via another member.

In another words, the present invention provides an inflator for an air bag, comprising:

a tubular housing including a gas discharge portion;

inflation means accommodated in the tubular housing for inflating the air bag;

mounting means provided in an outer circumferential surface of the tubular housing for fixing the inflator to a vehicle, the mounting means including a first fixing member that has a surface fixed to the outer circumferential surface, and a remaining surface radially extending from the outer circumferential surface, however, not contacting the same, the remaining surface having a radial length of 0.5 to 1.5 times a diameter of the tubular housing and being attached to the vehicle directly or indirectly.

In an inflator for an air bag of this invention, both of a case such that the inflator for an air bag is attached to the vehicle directly and a case such that the inflator disposed in a module case is attached to the vehicle are included.

In addition, as to the tubular housing of the inflator for an air bag of the present invention, a length L and a width (diameter) D can be either L<D, L=D or L>D, and L>D, which is an elongated shape is preferable. Here, the diameter D is a diameter of the portion where the first fixing member is attached.

In addition, a cross section of the tubular housing is preferably, but not limited to, a circle, and may be an oval or a polygon close to a circle. In the case of an oval, an average value between a major axis and a minor axis becomes a diameter, and in the case of polygon, a diagonal line becomes a diameter.

A gas discharge portion, which contains a gas discharge port, may be arranged in a tubular housing or in a diffuser portion attached to the tubular housing.

The first fixing member is necessary for securely fixing the inflator in a predetermined position. If it has a bulky shape (for example, a L-shape, an irregularly deformed shape, and so on), a bulky portion becomes a hindrance in transportation and handling, thereby lowering workability. On the other hand, even if it has not a bulky shape but it is too short, an attaching ability to a vehicle is lowered.

Thus, in the present invention, by making a radial length of the remaining surface not fixed to the tubular housing (surface not contacting with the tubular housing) 0.5 to 1.5 times a diameter of the tubular housing (when a cross section is circular), a transportation and handling ability can be improved while maintaining an attaching ability to a vehicle.

The radial length of the remaining surface not fixed to the tubular housing is preferably 1.0 to 1.5 times a diameter of the tubular housing.

The first fixing member can be formed into any shape suitable for a mounting position of the inflator as long as it meets said length ratio and is not bulky. And, for example, it can be a flat plate shape, curved shape, and so on.

Only one first fixing member can be used, or two or more members can be separately disposed in the axial direction (length direction). When only one member is used, its length preferably corresponds to, for example, a case that two members are disposed separately, in order to be fixed strongly.

The above invention further provides the inflator for an air bag, wherein a second fixing member having a shape which can form a surface of an different angle from that of the remaining surface of the first fixing member is further connected to the remaining surface, and the inflator is attached to a vehicle at the surface at a different angle of the second fixing member.

By using such a second fixing member, since an appropriate attaching angle can be set with accordance with a structure of a vehicle etc., an attaching work becomes easy. In addition, if an inflator is transported in a state that only the first fixing member is attached, and the second fixing member having a bulky shape is attached to the first fixing member in a step of mounting the inflator to a vehicle, workability in transportation and so on before attaching is not affected.

The above invention farther provides the inflator for an air bag, wherein a side shape of the second fixing member is generally L-shaped, with one surface being connected to the remaining surface of the first fixing member, and another surface, which becomes a surface at a different angle from the first fixing member, being connected to the vehicle.

The generally L-shaped side shape contains the cases such that breadths of two surfaces are the same and different, and further corresponds to the cases such that the angle between two surfaces is 90 degrees or another angle (preferably 45 to 135 degrees).

When a member in which breadths of two surfaces are the same and an angle between two surfaces is 90 degrees is used as the second fixing member, a perpendicular surface to the remaining surface of the first fixing member is formed, where the inflator is attached to a vehicle. By adjusting an angle between two surfaces, since an appropriate attaching angle can be set depending on structure of a vehicle etc., attaching work becomes easy.

The above invention further provides the inflator for an air bag, wherein an inflation means for an air bag is a combination of at least one of pressurized gas charged in the tubular housing and a gas generating agent for generating gas in combustion loaded in the tubular housing, and an ignition means.

The inflator for an air bag of the present invention can be applied to (1) an inflator of a type mainly using pressurized gas, (2) an inflator of a type mainly using a gas generating agent and (3) an inflator of a type using both of pressurized gas and a gas generating agent, as inflation means for an air bag. In particular, the present invention is suitable for an inflator of a type mainly using pressurized gas.

The ignition means is used, in the type (1) to break closing means (rupturable plate) closing a path connecting a gas discharge port and a pressurized-gas loading space, in the type (2) to generate high temperature gas by igniting and burning the gas generating agent, and in the type (3) for both operations of (1) and (2).

The above invention further provides the inflator for an air bag, which is mounted to a ceiling of a vehicle.

As an inflator for such usage type, an inflator for a curtain air bag system is particularly suitable. As to a curtain air bag system, there is a case that the inflator is installed in a side portion above a window of a vehicle or near a ceiling in a pillar in a back seat for development from the above to cover a side window of a vehicle, and these installation positions are included in a ceiling.

The present invention further provides a method of assembling an inflator which uses pressurized gas as an inflation means for an air bag, comprising the steps of fixing the first fixing member to the circumferential surface of the tubular housing by welding, a step of maintaining inside of the tubular housing sealed state followed by doing pressure proof test of the tubular housing, a step of charging pressurized gas into the tubular housing, and a step of optionally attaching the second fixing member to the first fixing member.

In inflators of the types (1) and (3) using pressurized gas as an inflation means for an air bag, pressure resistance which can maintain a state that pressurized gas is charged under high pressure for a long term (not less than 10 years) is needed along with airtightness in which pressurized gas doesn't leak. So, a pressure proof test for confirming these becomes necessary.

However, if the pressure proof test is conducted, and then the first fixing member is fixed to the tubular housing by welding, there is a risk that pressure resistance is damaged, since, for example, wall thickness of the housing becomes thin due to welding work. So, in order to maintain quality, after fixing by welding the first fixing member, the pressure proof test is conducted. In addition, when the second fixing member is used, since it is attached to the first fixing member by a method of welding, screwing, fitting and so on, pressure resistance of an inflator is not damaged.

The above invention further provides a method of attaching the inflator for an air bag to a vehicle, which is a method of attaching the first fixing member directly to the vehicle, a method of attaching the second fixing member directly to the vehicle, or a method of attaching the second fixing member to the vehicle and then attaching the first fixing member to the second fixing member.

The present invention also provides a method of assembling an inflator for an air bag, comprising the steps of fixing a first fixing member, including a remaining surface, to an outer circumferential surface of a tubular housing of the inflator by welding such that the remaining surface extends radially whose length is 0.5 to 1.5 times a diameter of the tubular housing, keeping an inside of the tubular housing sealed air-tightly, and conducting a pressure proof test of the tubular housing.

Further, the present invention also provides a method of assembling the above inflator, further comprising the steps of fixing a second fixing member to the remaining surface, wherein the second fixing member has a shape which can form a surface at a different angle from that of the remaining surface of the first fixing member.

According to the inflator of the present invention, handling ability in transporting and mounting an inflator is improved.

DETAILED DESCRIPTION OF THE INVENTION (1) First Embodiment

Figure 1:
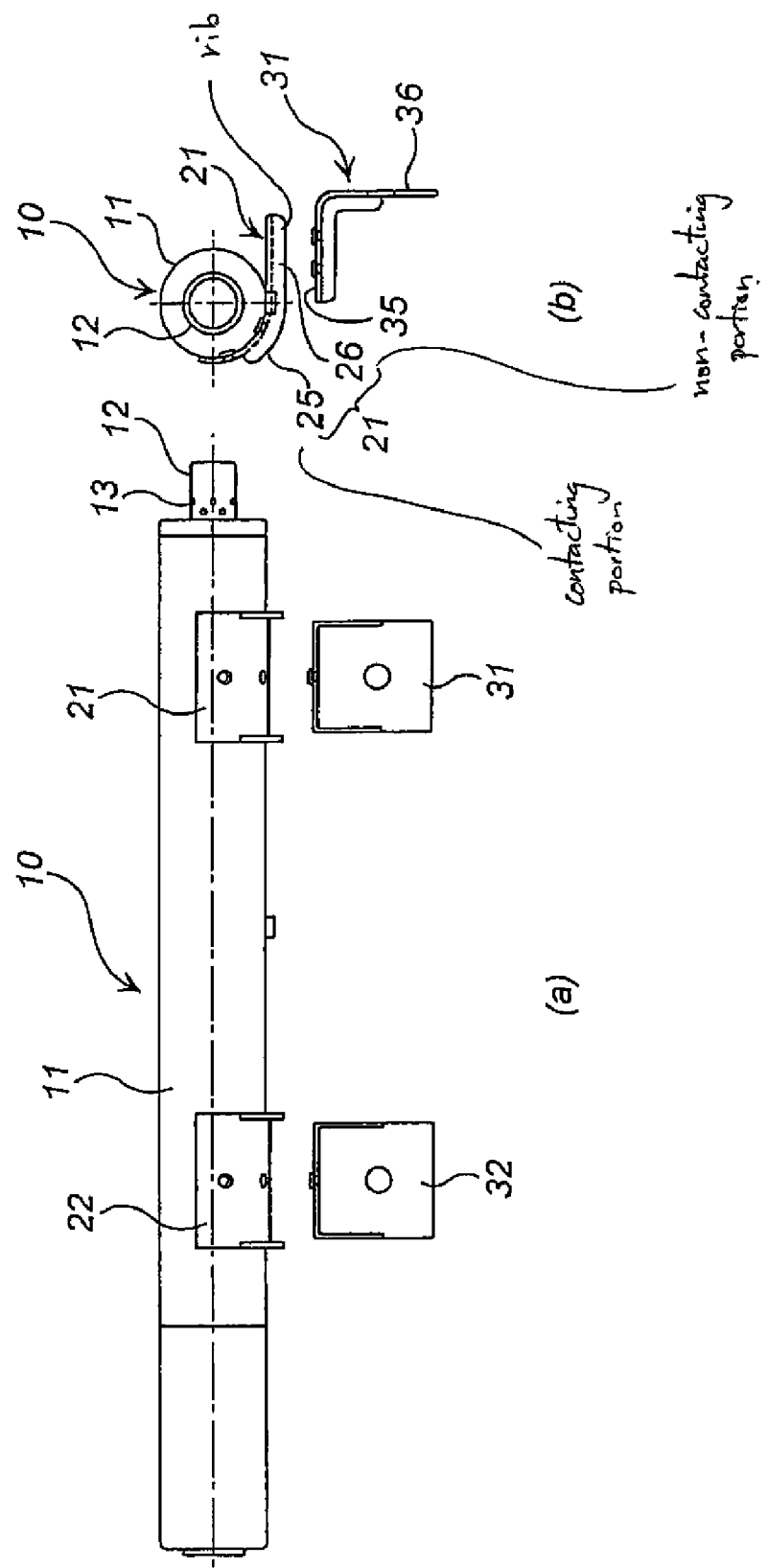
FIG. 1(*a*) is a front view of an inflator of the present invention and FIG. 1(*b*) is a side view of FIG. 1(*a*).
Figure 2:
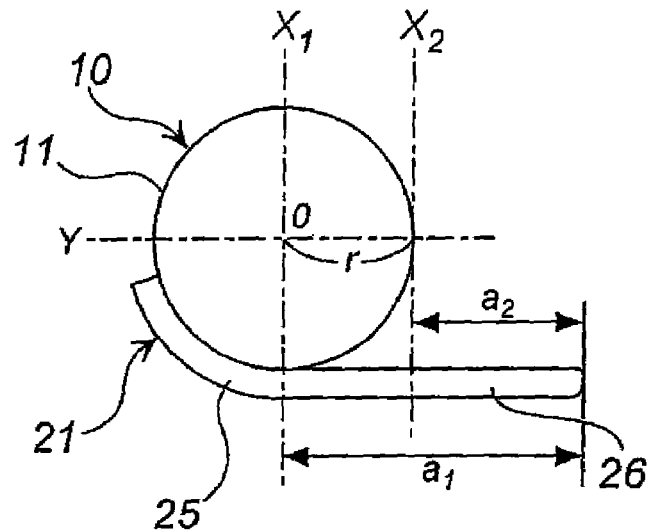
FIG. 2 is a side view of an inflator of the present invention.
Figure 3:
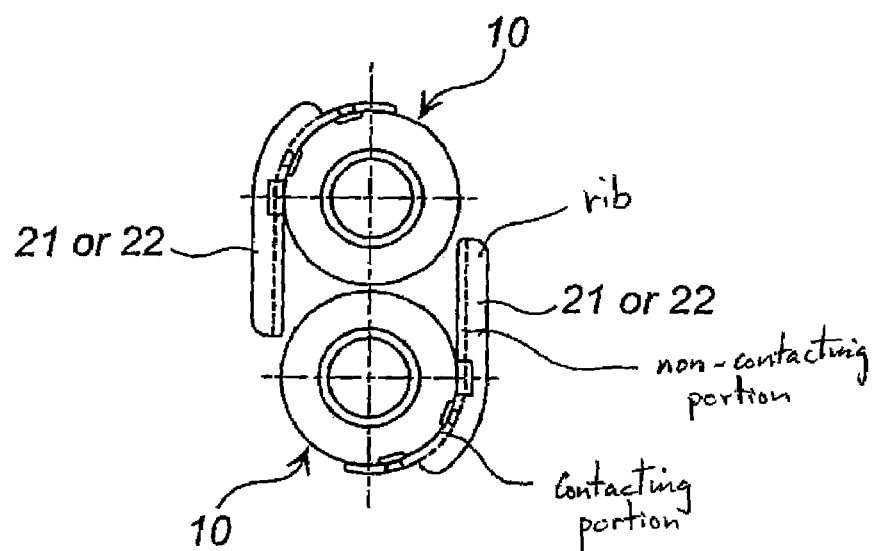
FIG. 3 is a drawing for explaining handling of the inflator of the present invention.
Figure 4:
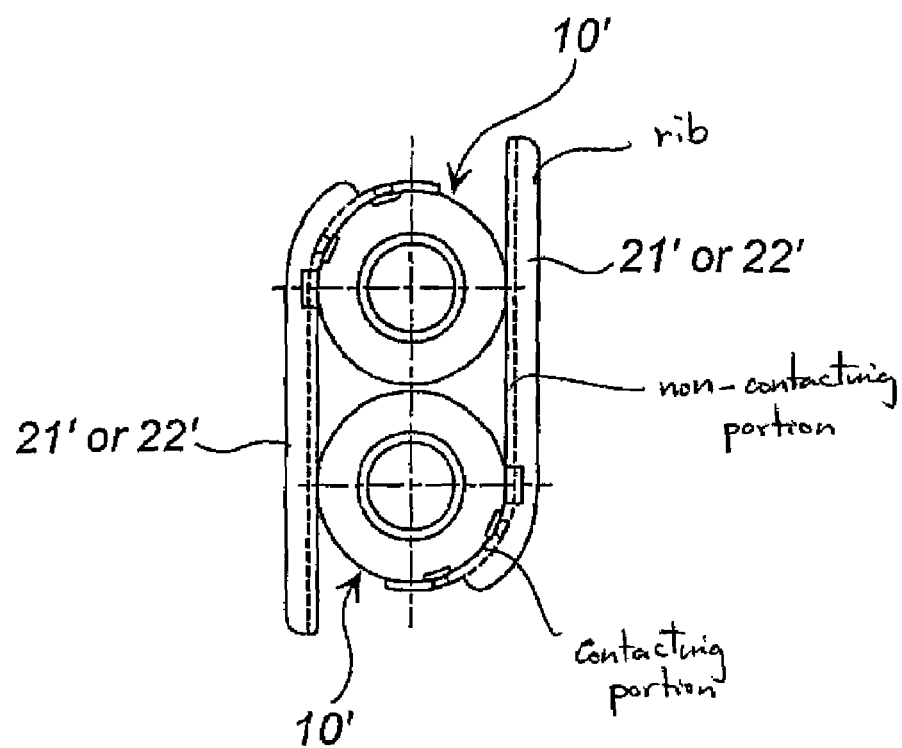
FIG. 4 is a drawing for explaining handling of an inflator for comparison.

One embodiment of an inflator for an air bag is explained according to FIGS. 1 to 4. FIG. 1(*a*) is a front view of an inflator of the present invention and FIG. 1(*b*) is a side view of FIG. 1(*a*). FIG. 2 is a side view of an inflator of the present embodiment for explaining relation between the tubular housing and the first fixing member. FIG. 3 is a drawing for explaining handling of the inflator of the present embodiment, and FIG. 4 is a drawing for explaining handling of an inflator for comparison.

An inflator 10 for an air bag has inflation means for an air bag inside a tubular housing 11 and has a diffuser portion 12 including plural gas discharging ports 13 at one end portion of the tubular housing 11.

The inflator 10 in FIG. 1 is the type (1) described above, and pressurized gas such as argon or helium is charged under high pressure in the tubular housing 11. In addition, at least a gas discharge path extending between a space in which the pressurized-gas is charged and the diffuser portion 12 is blocked by a rupturable plate (not shown), and ignition means (not shown) for breaking the rupturable plate is also provided. Other configurations are the same as those of a conventionally known inflator.

Two flat plate-shaped first fixing members 21 and 22 are disposed axially with a distance therebetween on a circumferential surface of the tubular housing 11. In addition, three or more first fixing members can be separately disposed according to an axial length of the tubular housing 11.

As to the first fixing member 21, part of a surface (a contacting surface) 25 is fixed by welding along a circumferential surface of the tubular housing 11, and the remaining surface (a non-contacting surface) 26 is radially extended, not contacting the circumferential surface of the tubular housing 11. The first fixing member 22 also has such a surface (contacting surface) and the remaining surface (non-contacting surface) like the first fixing member 21.

The contacting area between the first fixing member 21 and the circumferential surface of the tubular housing 11 is not limited, and they can be welded linearly or at plural points. However, in order to increase the strength of welding connection and facilitate a welding work, the contacting surface 25 preferably contacts with an arc comprising one eighth to one third of the circle in a cross section as shown in FIG. 2.

As shown in FIG. 2, in the first fixing member 21, the length of the non-contacting surface 26 in the radial direction of the tubular housing 11 ($a_1$ in FIG. 2) is 0.5 to 1.5 times, preferably 1.0 to 1.5 times the diameter ($2r$) of the tubular housing 11.

In other words, providing the tangent line $X_2$ parallel to the line $X_1$ passing through the center O of the tubular housing 11, where the center line Y is perpendicular to $X_1$ and $X_2$, the length $a_2$ ($=a_1-r$) in FIG. 2 is not longer than the diameter ($2r$) of the tubular housing, preferably 0.5 to 1.0 times the above diameter.

The following effects are obtained by arranging the first fixing members 21 and 22 to be attached to an inflator 10 in the above manner.

As shown in FIG. 3, when two inflators 10 are combined to be stored and transported, the first fixing members 21 and 22 of the inflator 10 of the present invention are not bulky, thereby, handling is easy. In addition, even when two inflators 10 are not combined and each inflator 10 is handled separately, the first fixing members 21 and 22 are not hitched, thereby, handling is easy. On the other hand, if first fixing members 21' and 22' are bulky in shape, that is $a_1$ is longer than 1.5 times $2r$ as an inflator 10' shown in FIG. 4, handling in storage and transportation is made difficult. That is because the first fixing members 21' and 22' extending from one inflator 10' protrude outside of combined another inflator 10', which means non-contacting surface is too long.

Furthermore, if non-contacting surface 26 of a first fixing members 21 and 22 is too long, there is a risk that an inflated and developed air bag provides excessive impact to the head of a vehicle occupant because of an mounting position of the inflator 10. In particular, when the inflator 10 is applied to a curtain air bag system, an installing position of the inflator 10 is near the head of a vehicle occupant such as a ceiling portion of a vehicle or on a C pillar at a position near the ceiling, so that it becomes important to properly obtain a space between the head of a vehicle occupant and an inflated air bag. Thus, by satisfying the above length ratio, a space between the inflator 10 and the head of the vehicle occupant can be properly obtained to absorb an excessive impact towards the occupant at the development of the air bag, and additionally to protect the occupant against the collision impact of the vehicle.

The inflator 10 is mounted to a vehicle directly at the non-contacting surface 26 of the first fixing member 21 and the non-contacting surface of the first fixing member 22, or via another member.

As such another member, second fixing members 31 and 32 shown in FIGS. 1 (*a*) and (*b*) can be used. In addition, when three or more first fixing members are separately disposed, the same number of the second fixing members are used.

The second fixing members 31 and 32 have a shape which can form a flat surface at a different angle from that of the remaining surface of the first fixing members 21 and 22 (non-contacting surface 26 et al.) when connected to the remaining surface (non-contacting surface 26 et al.). More concretely, one including a bottom surface 35 and a supporting surface 36 arranged perpendicular to the bottom surface 35, whose side shape is generally L-shaped, is preferable as shown in FIG. 1(*b*).

The second fixing member 31 is fixed to the non-contacting surface 26 of the first fixing member 31 at its bottom surface 35 by a method of screwing, welding, fitting and so on, and it is fixed to a predetermined position of a vehicle (ceiling et al.) at the supporting surface 36. The second fixing member 32 is also fixed to a predetermined position of a vehicle like the second fixing member 31.

Mounting work can be performed in accordance with a vehicle structure since a flat surface (supporting surface 36 etc.) at a different angle from that of the remaining surface of the first fixing members 21 and 22 (non-contacting surface 26 et al.) is formed by using such second fixing members 31 and 32. Mounting work in accordance with a vehicle structure is improved by forming the angle between the bottom surface 35 and the supporting surface 36 into the desired value, preferably 45 to 135 degrees.

In a side air bag system and a curtain air bag system, since a mounting space for such systems in a vehicle is limited and, in addition, inflators are mounted on both sides of a vehicle, it is necessary to prepare respective fixing members for the left side and the right side.

Therefore, if the first fixing member and the second fixing member are integrated to be a pair of fixing members, prepared for the left side and the right side respectively, it is necessary to manufacture each of them separately and confusion of parts likely happens. In this point, when the first fixing member are formed in the same shape for the both sides, only the second fixing members are made different for the left and the right and the second fixing members are left unattached, confusion of parts never happens.

Furthermore, although a shape of a fixing member (shape of one attached to a vehicle in particular) is changed according to a type of a car to which the member is attached, if two kinds of the fixing members are formed separately, the first members can have the same shape and only the second fixing members need to be changed, confusion of parts in manufacture and confusion of completed products can be avoided by the same reason as above.

(2) Second Embodiment

Figure 5:
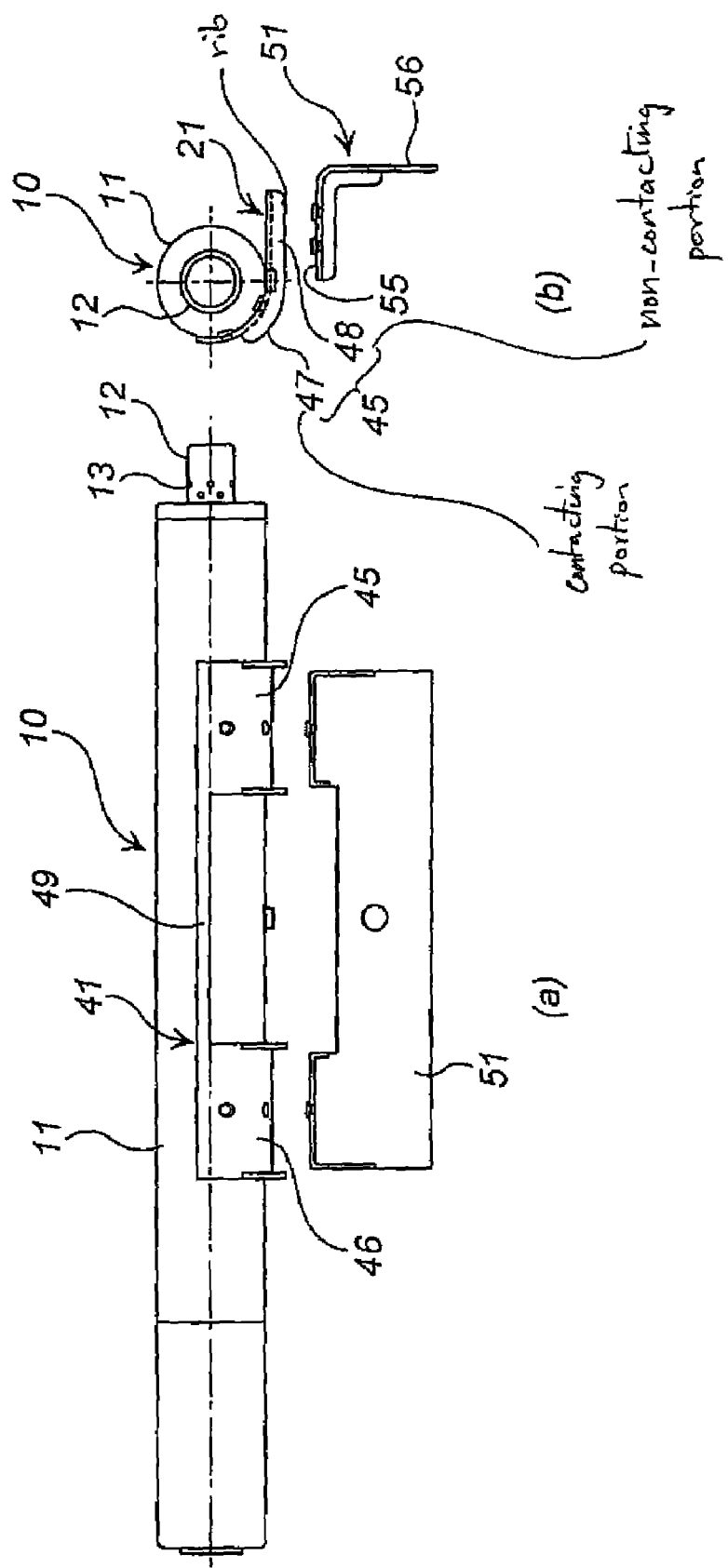
FIG. 5(*a*) is a front view of an inflator of the present invention and FIG. 5(*b*) is a side view of FIG. 5(*a*).

Another embodiment of an inflator for an air bag according to the present invention is explained according to FIG. 5. FIG. 5(*a*) is a front view of an inflator of the present invention and FIG. 5(*b*) is a side view of FIG. 5(*a*).

The inflator 10 in FIG. 5 is obtained in such a manner that the two separate first fixing members 21 and 22 of the inflator 10 in FIG. 1 are integrated into a single first fixing member 41 and that, similarly, the two second fixing members 31 and 32 are integrated into a single second fixing member 51.

The first fixing member 41 has a first fixing portion 45 having a contacting surface 47 to a tubular housing 11 and a non-contacting surface 48, and a first fixing portion 46 similarly having a contacting surface and a non-contacting surface, and the first fixing portion 45 and the first fixing portion 46 are connected by a bridge portion 49. The first fixing member 41 is fixed to a circumferential surface of the tubular housing 11, welded at the contacting surface 47 of the first fixing portion 45, the contacting surface of the first fixing portion 46 and the bridge portion.

The contacting surface 47 and the non-contacting surface 48 of the first fixing portion 45 meet requirements similar to those which the contacting surface 25 and the non-contacting surface 26 shown in FIG. 2 meet, and the contacting surface and the non contacting surface of the second fixing portion 46 also meet similar requirements.

With this single first fixing member 41, productivity is enhanced since it can be attached in a single work. In addition, fixing strength is increased since the contacting area between the housing 11 and the first fixing member 41 is increased.

The second fixing member 51 has a bottom surface 55 and a supporting surface 56, and the bottom surfaces 55 on both end sides in the length direction are fixed to the non-contacting surfaces 48 of the first fixing portions 45 and 46 by a method of screwing, welding, fitting and so on. In the second fixing member 51, an angle between a bottom surface 55 and a supporting surface 56 can be arranged to be a desired angle, preferably 45 to 135 degrees.

As thus described, effect similar to the first fixing member 41 is obtained with the single second fixing member 51.

In the embodiment shown in FIG. 5, a single second fixing member 51 can be connected to two first fixing members 45 and 46 separately disposed as in FIG. 1 in stead of bridging them, or the second fixing member 51 can be separated into two.

(3) Third Embodiment

Assembling method of the inflator 10 for an air bag is explained step by step according to FIG. 1. In each step below, two or more steps can be integrated to one step, or one step can be divided into two or more steps.

At first, in the first step, the first fixing members 21 and 22 are fixed by welding to a circumferential surface of the tubular housing 11. Publicly known welding methods such as resistance welding, laser welding and so on can be applied.

In the next step, after the inside of the tubular housing is kept in a sealed state, a pressure proof test of the tubular housing is conducted.

As to products in which pressurized gas is charged under high pressure, it is required by law (High Pressure Gas Safety Law) to conduct a pressure proof test to all products to confirm safety. As a concrete method of the pressure proof test, a method disclosed in JP-A No. 2003-35643 is applied.

If the first fixing members 21 and 22 are fixed by welding after the pressure proof test, there is a risk that pressure resistance is lowered because the tubular housing 11 is damaged by this welding work (for example, wall thickness of the housing becomes thin). So, the pressure proof test is conducted after the first fixing members 21 and 22 are fixed by welding. If the tubular housing 11 is damaged due to welding of the first fixing members 21 and 22, it never passes the pressure proof test. Thus, defective inflators can be certainly excluded.

In the next step, after pressurized gas is charged into the tubular housing 11, the second fixing members 31 and 32 are attached to the first fixing members 21 and 22 if required.

If the pressure proof test is conducted after the second fixing members 31 and 32 in a bulky shape are attached, handling ability becomes difficult. So, the second fixing members 31 and 32 are attached after the pressure proof test, if required.

(4) Fourth Embodiment

A mounting method of the inflator 10 for an air bag to a vehicle is explained according to FIG. 1. There are following three methods of mounting it to a vehicle. The inflator 10 can be mounted into a module case in the same process.

First Mounting Method

The second fixing members 31 and 32 are left unattached to the inflator 10, and only the first fixing members 21 and 22 are attached to the inflator 10. And the inflator 10 is mounted to a vehicle by directly attaching the first fixing members 21 and 22 to a vehicle. At this time, a receiving member for the first fixing members 21 and 22 can be attached, if required, to a mounting position on the vehicle side.

Second Mounting Method

The inflator 10 has the first fixing members 21 and 22, and the second fixing members 31 and 32 fixed thereto. And the inflator 10 is attached to a vehicle by directly attaching the second fixing members 31 and 32 to a vehicle. At this time, a receiving member for the second fixing members 31 and 32 can be attached, if required, to a mounting position on the vehicle side.

Third Mounting Method

The second fixing members 31 and 32 are left unattached, and only the first fixing members 21 and 22 are attached to the inflator 10. Meanwhile, the second fixing members 31 and 32 are attached to a predetermined position of a vehicle. And the inflator 10 is mounted to a vehicle by attaching the first fixing members 21 and 22 to the second fixing members 31 and 32.

Incidentally, when the inflator 10 is applied as an inflator for a curtain air bag system, the inflator 10 is mounted to a ceiling of a vehicle. An introducing pipe connecting the inflator and the air bag is made as short as possible to shorten an inflating and developing time of the air bag. In view of this, preferably, an mounting position of the inflator 10 is between a top of a side window and a ceiling surface in a vehicle or is near the ceiling in a C pillar portion (a rear pillar in the back seat).

The invention claimed is:

1. An inflator for an air bag, comprising:
a tubular housing including a gas discharge portion;
a first fixing member provided on an outer circumferential surface of the tubular housing for fixing the inflator to a vehicle, the first fixing member including a contacting surface formed of a strip-like member and fixed to the outer circumferential surface and having a shape that corresponds to a shape of the outer circumferential surface, and a non-contacting surface extending in a direction tangential to the outer circumferential surface from one end of the contacting surface without contacting the outer circumferential surface; and
a second fixing member having a shape that forms a supporting surface extending at an angle different from that of the non-contacting surface, the second fixing member being made of a member separate from the first fixing member, such that the inflator is mounted to the vehicle at the supporting surface by connecting the second fixing member to the non-contacting surface.

2. The inflator for an air bag as claimed in claim 1, wherein a side shape of the second fixing member is generally L-shaped, with a first surface being connected to the non-contacting surface of the first fixing member, and a second surface, which is the supporting surface adapted to be connected to the vehicle.

3. The inflator for an air bag as claimed in claim 1, further comprising:
   inflation means accommodated in the tubular housing for inflating the air bag,
   wherein the inflation means is a combination of at least one of pressurized gas charged in the tubular housing and a gas generating agent generating gas in combustion loaded in the tubular housing, and ignition means.

4. The inflator for an air bag as claimed in claim 1, wherein the inflator is mounted to a ceiling of a vehicle.

5. The inflator for an air bag as claimed in claim 1, wherein the non-contacting surface has a radial length of 0.5 to 1.5 times a diameter of the tubular housing.

6. The inflator for an air bag as claimed in claim 1, wherein the first fixing member is fixed to the outer circumferential surface of the tubular housing by welding.

7. The inflator for an air bag as claimed in claim 1, wherein the second fixing member is connected to the non-contacting surface by welding.

8. A method of assembling an inflator for an air bag and mounting the same to a vehicle, the inflator comprising a tubular housing containing inflation means for the air bag and a gas discharge portion and further comprising mounting means for mounting the inflator to a vehicle, wherein
   the mounting means is one or more first fixing members fixed to a circumferential surface of the tubular housing and a second fixing member,
   the first fixing member is fixed such that it has a surface fixed to at least part of the circumferential surface of the tubular housing and a remaining surface radially extended, not contacting the circumferential surface of the tubular housing,
   the second fixing member has a bottom surface and a supporting surface, the supporting surface and the remaining surface of the first fixing member forming surfaces at different angles from each other when the bottom surface is fixed to the remaining surface,
   the method comprising steps of:
   fixing the surface of the first fixing member to the circumferential surface of the tubular housing by welding;
   charging a pressurized gas into the tubular housing; and
   welding the remaining surface of the first fixing member to the second fixing member after mounting the second fixing member to the vehicle.

9. The method of assembling an inflator for an air bag and mounting the same to a vehicle according to claim 8, wherein an angle between the bottom surface and the supporting surface is 45 to 135 degrees, and the bottom surface of the second fixing member and the remaining surface of the first fixing member are welded to each other.

10. The method of assembling an inflator for an air bag and mounting the same to a vehicle according to claim 8, further comprising the steps of:
    welding and fixing a surface of the first fixing member to the circumferential surface of the tubular housing;
    keeping an inside of the tubular housing in a sealed state; and then
    conducting a pressure proof test of the tubular housing.

11. The method of assembling an inflator for an air bag and mounting the same to a vehicle according to claim 8, wherein the inflator for the air bag is mounted to a ceiling of the vehicle.

12. A method of assembling an inflator for an air bag and mounting the same to a vehicle, the inflator comprising a tubular housing containing inflation means for the air bag and a gas discharge portion and further comprising mounting means for mounting said inflator to a vehicle, wherein
    the mounting means is one or more first fixing members fixed to a circumferential surface of the tubular housing and a second fixing member,
    the first fixing member is fixed such that it has a surface fixed to at least part of the circumferential surface of the tubular housing and a remaining surface radially extended, not contacting the circumferential surface of the tubular housing,
    the second fixing member has a bottom surface and a supporting surface, the supporting surface and the remaining surface of the first fixing member forming surfaces at different angles from each other when the bottom surface is fixed to the remaining surface,
    the method comprising steps of:
    fixing the surface of the first fixing member to the circumferential surface of the tubular housing by welding;
    charging a pressurized gas into the tubular housing; and
    mounting the second fixing member to the vehicle after welding the remaining surface of the first fixing member to the second fixing member.

13. The method of assembling an inflator for an air bag and mounting the same to a vehicle according to claim 12, wherein an angle between the bottom surface and the supporting surface is 45 to 135 degrees, and the bottom surface of the second fixing member and the remaining surface of the first fixing member are welded to each other.

14. The method of assembling an inflator for an air bag and mounting the same to a vehicle according to claim 12, further comprising steps of:
    welding and fixing a surface of the first fixing member to the circumferential surface of the tubular housing;
    keeping an inside of the tubular housing in a sealed state; and then
    conducting a pressure proof test of the tubular housing.

15. The method of assembling an inflator for an air bag and mounting the same to a vehicle according to claim 12, wherein the inflator for the air bag is mounted to a ceiling of the vehicle.

* * * * *